(12) United States Patent
De et al.

(10) Patent No.: US 12,008,800 B2
(45) Date of Patent: Jun. 11, 2024

(54) CONFLATION OF GEOSPATIAL POINTS OF INTEREST AND GROUND-LEVEL IMAGERY

(71) Applicant: UT-Battelle, LLC, Oak Ridge, TN (US)

(72) Inventors: Debraj De, Knoxville, TN (US); Rutuja Gurav, Riverside, CA (US); Junchuan Fan, Knoxville, TN (US); Gautam Thakur, Knoxville, TN (US)

(73) Assignee: UT-Battelle, LLC, Oak Ridge, IL (US)

( * ) Notice: Subject to any disclaimer, the term of this patent is extended or adjusted under 35 U.S.C. 154(b) by 0 days.

(21) Appl. No.: 18/383,633

(22) Filed: Oct. 25, 2023

(65) Prior Publication Data
US 2024/0144655 A1 May 2, 2024

Related U.S. Application Data

(60) Provisional application No. 63/419,726, filed on Oct. 27, 2022.

(51) Int. Cl.
*G06V 10/00* (2022.01)
*G06V 10/764* (2022.01)
(Continued)

(52) U.S. Cl.
CPC .......... *G06V 10/774* (2022.01); *G06V 10/764* (2022.01); *G06V 10/776* (2022.01);
(Continued)

(58) Field of Classification Search
CPC .. G06V 10/774; G06V 10/764; G06V 10/776; G06V 10/82; G06V 20/50; G06V 20/70; H04N 19/46
See application file for complete search history.

(56) References Cited

U.S. PATENT DOCUMENTS

| 8,340,360 B2 | 12/2012 | Chen et al. |
| 2010/0290699 A1* | 11/2010 | Adam ................ G06V 20/70 |
| | | 382/155 |

(Continued)

OTHER PUBLICATIONS

Andrade, et al. "POI Mining for Land Use Classification: A Case Study," International Journal of Geo-Information, 2020 (24 pages).

(Continued)

*Primary Examiner* — Ping Y Hsieh
(74) *Attorney, Agent, or Firm* — Lempia Summerfield Katz LLC

(57) ABSTRACT

A prediction system harvests geo-tagged ground-level images through one or more algorithms. The system receives point of interest data representing structures or events and tags the geo-tagged ground-level images with a probability describing a classification. The system tags point of interest data with a hierarchical genre classification and encodes the tagged geo-tagged ground-level images as vectors to form nodes and edges in a proximity graph. The system encodes tagged points of interest data as similarity vectors to render more nodes and more edges on the proximity graph associated with the tagged geo-tagged ground-level images nodes by calculated semantic distances. The system splits the proximity graph into a training subgraph and a testing subgraph and trains a neural network by aggregating and sampling information from neighboring nodes within the training subgraph graph and validates through the testing subgraph. Training ends when a loss measurement is below a threshold.

17 Claims, 7 Drawing Sheets

(51) Int. Cl.

| | |
|---|---|
| *G06V 10/774* | (2022.01) |
| *G06V 10/776* | (2022.01) |
| *G06V 10/82* | (2022.01) |
| *G06V 20/50* | (2022.01) |
| *G06V 20/70* | (2022.01) |
| *H04N 19/46* | (2014.01) |

(52) U.S. Cl.
CPC .............. *G06V 10/82* (2022.01); *G06V 20/50* (2022.01); *G06V 20/70* (2022.01); *H04N 19/46* (2014.11)

(56) References Cited

U.S. PATENT DOCUMENTS

| | | | | |
|---|---|---|---|---|
| 2014/0205189 | A1* | 7/2014 | Cao ....................... | G06F 18/214 382/160 |
| 2017/0287170 | A1* | 10/2017 | Perona ................... | G06V 20/56 |
| 2022/0092812 | A1* | 3/2022 | Boudreaux ............ | G06F 18/214 |

OTHER PUBLICATIONS

Hamilton, et al. "Inductive Representation Learning on Large Graphs,"31st Conference on Neural Information Processing Systems (NIPS 2017), Sep. 2018 (19 pages).

He et al., "Deep Residual Learning for Image Recognition," 2016 IEEE Conference on Computer Vision and Pattern Recognition, 2016 Publication (9 pages).

Hu et al., "Extracting and understanding urban areas of interest using geotagged photos," Computers, Environment and Urban Systems, 2015 (15 pages).

Kuo et al., "Efficient Method for POI/ROI Discovery Using Flickr Geotagged Photos," International Journal of Geo-Information, 2018 (20 pages).

Palumbo et al., "SONET: A Semantic Ontological Network Graph for Managing Points of Interest Data Heterogeneity," GeoHumanities '19 Nov. 2019 (6 pages).

Rae et al., "Mining the Web for Points of Interest," SIGIR 12, 2012,(10 pages).

Thakur et al., "Accelerated Assessment of Critical Infrastructure in Aiding Recovery Efforts During Natural and Human-made Disaster," SIGSPATIAL '21 Nov. 2021 (12 pages).

\* cited by examiner

CONFLATION OF GEOSPATIAL POINTS OF INTEREST AND GROUND-LEVEL IMAGERY

1. PRIORITY CLAIM

This application claims priority to U.S. Provisional Patent Application No. 63/419,726, titled "Conflation of Geospatial Point of Interest Data and Ground-level Imagery for Joint Semantic Graph", which was filed on Oct. 27, 2022, which is herein incorporated by reference.

2. STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

3. TECHNICAL FIELD

This disclosure relates to predictive systems and specifically to predictive systems trained on points of interest and images associated with geospatial locations that predict semantic relationships and build knowledge graphs.

4. RELATED ART

Points of interest provide information about places and events. They identify landmarks that identify areas such as cafes, hospitals, markets, schools, church, government buildings, gas stations, etc. They provide marketing opportunities to promote products and services at pin-point-locations. Their publication highlight locations, events, and are used to deliver services.

Associating points of interest with images of geospatial locations presents significant challenges due to the need to acquire up-to-date data that represent places of interest, their geographical coordinates, their current appearance, and the activities happening in or around those locations. This task is made even more complicated by the constantly changing nature of the data and the changing objects they describe, which covers diverse locations and categories from various geographic regions.

Furthermore, the availability of points of interest data and image data is uneven, leading to biases towards well-reported areas while underrepresenting lesser-reported regions. Aligning and integrating this disparate data is also challenging since it comes in various formats and is generated in different contexts.

DESCRIPTION OF THE DRAWINGS

The patent or application file contains at least one drawing executed in color. Copies of this patent or patent application publication with color drawing(s) will be provided by the Office upon request and payment of the necessary fee. The components in the figures are not necessarily to scale, emphasis instead being placed upon illustrating the principles of the invention. Moreover, in the figures, like-referenced numerals designate corresponding parts throughout the different views.

DETAILED DESCRIPTION

A predictive system and process (referred to as a predictive system) provide accurate and comprehensive predictive analytics. The systems process large data sets from many sources. Each data set may have unique attributes, spatial resolution, accuracy, timelines and/or formats. Through machine learning, the predictive systems execute data conflations that leverage geospatial data that includes geo-tagged point of interest data attributed with categories with geo-tagged ground-level images data attributed with probabilistic tags. The disclosed systems generate graphical models (e.g., large knowledge graphs) of data conflations that include relational/semantic edges. A semantic edge represents a relationship between a point of interest or image. The system learns patterns and structures by computing scores between nodes based on semantic information. The creation and resulting predictive systems provide the benefit of proactive predictive analysis and predictions making computers smarter, more efficient, and user-friendly. The predictive systems streamlines processes, reduce human interactions that occur when computers are used as a tool, and enhance computer system performance and functionality.

Figure 1:
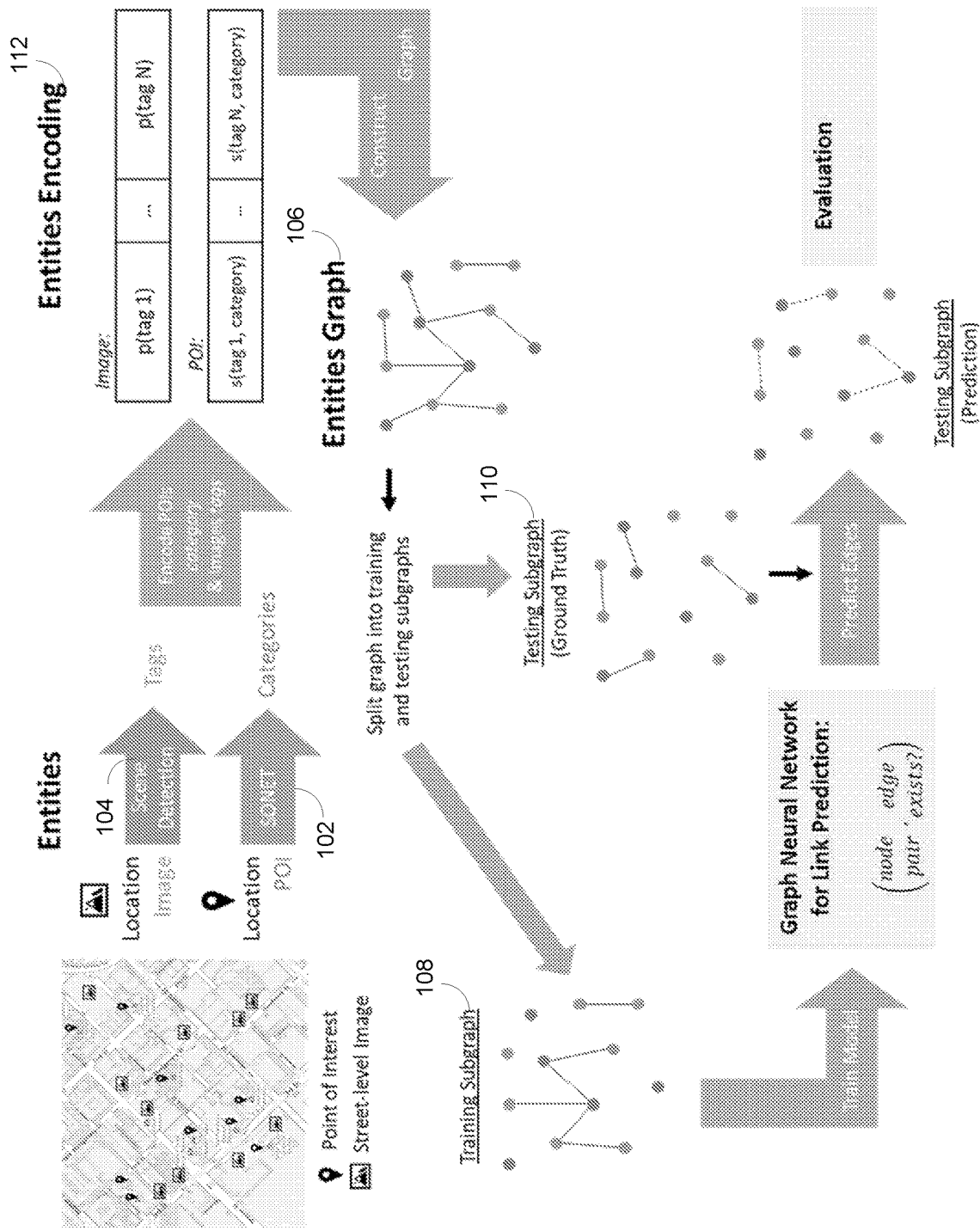
FIG. 1 is a process that generates a predictive system.

To generate a predictive system, a graph-based analysis is executed on point of interest data received through transceivers 716 (shown in FIG. 7) and a semantic ontological network 102 and geo-tagged ground-level images harvested by one or more scene detection algorithms 104 shown in FIG. 1. The scene detection algorithms 104 automatically identifies, segments, and geotags, images from media to generate an image dataset with metadata storing details of the geographic coordinates. Some alternate metadata structures associated with scenes and point of interest data provide details about the origin of the data, such as who and what collected it, record any transformations of the data, indicate a version level, indicate how missing data values should be processed, and/or include licensing and usage terms indicating its restrictions of use, for example. Points of interest may comprise permanent structures such as landmarks, schools, buildings, historical sites, business, public services, shops, restaurants, and/or etc., for example. They may also refer to temporal, asynchronous, and/or periodic events, such as music and/or food festivals, art festivals, street fairs and markets, sporting events, cultural celebrations, business and technology conferences, charity events, and/or etc.

Figure 6:
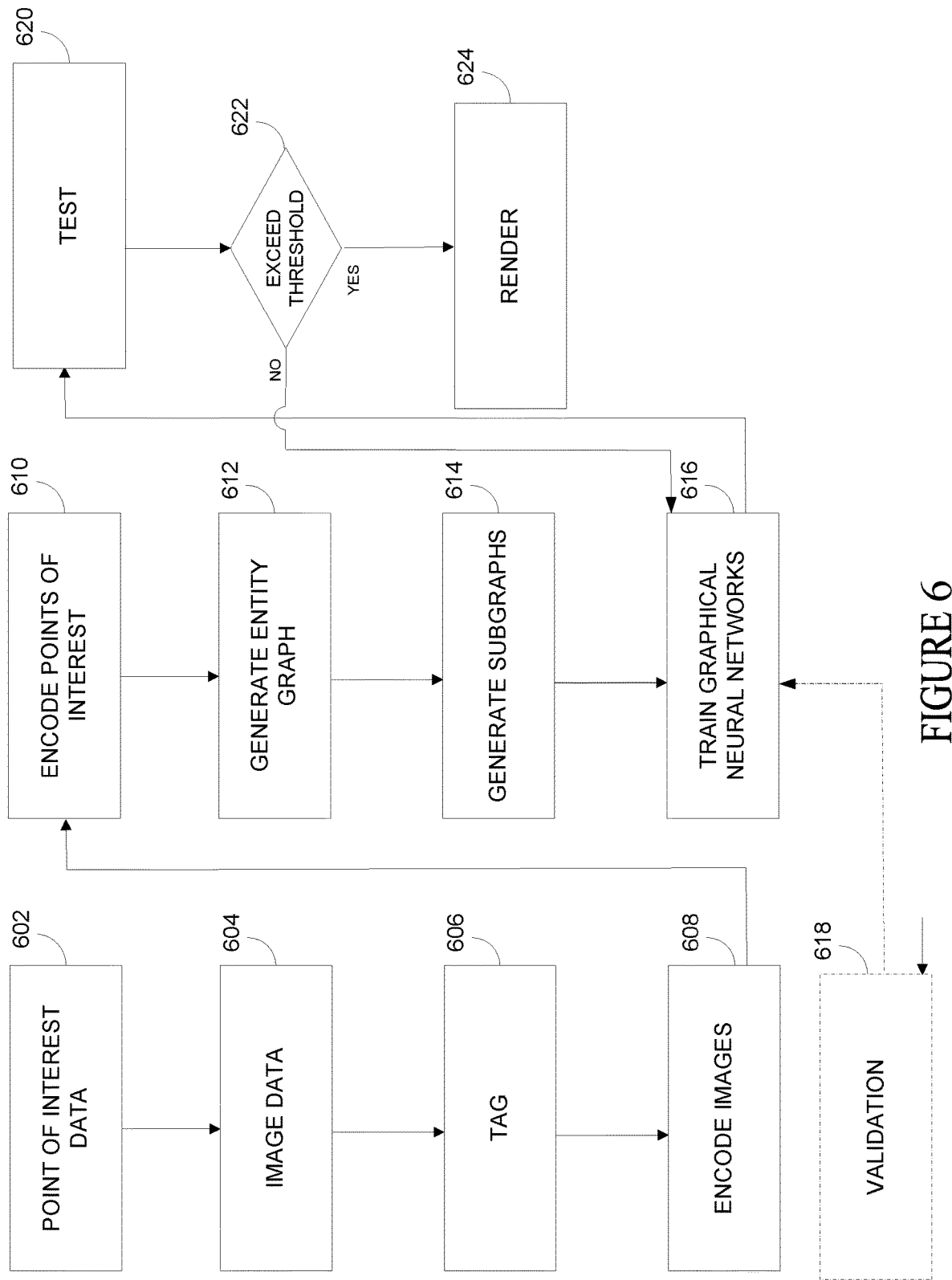
FIG. 6 is a predictive process.
Figure 7:
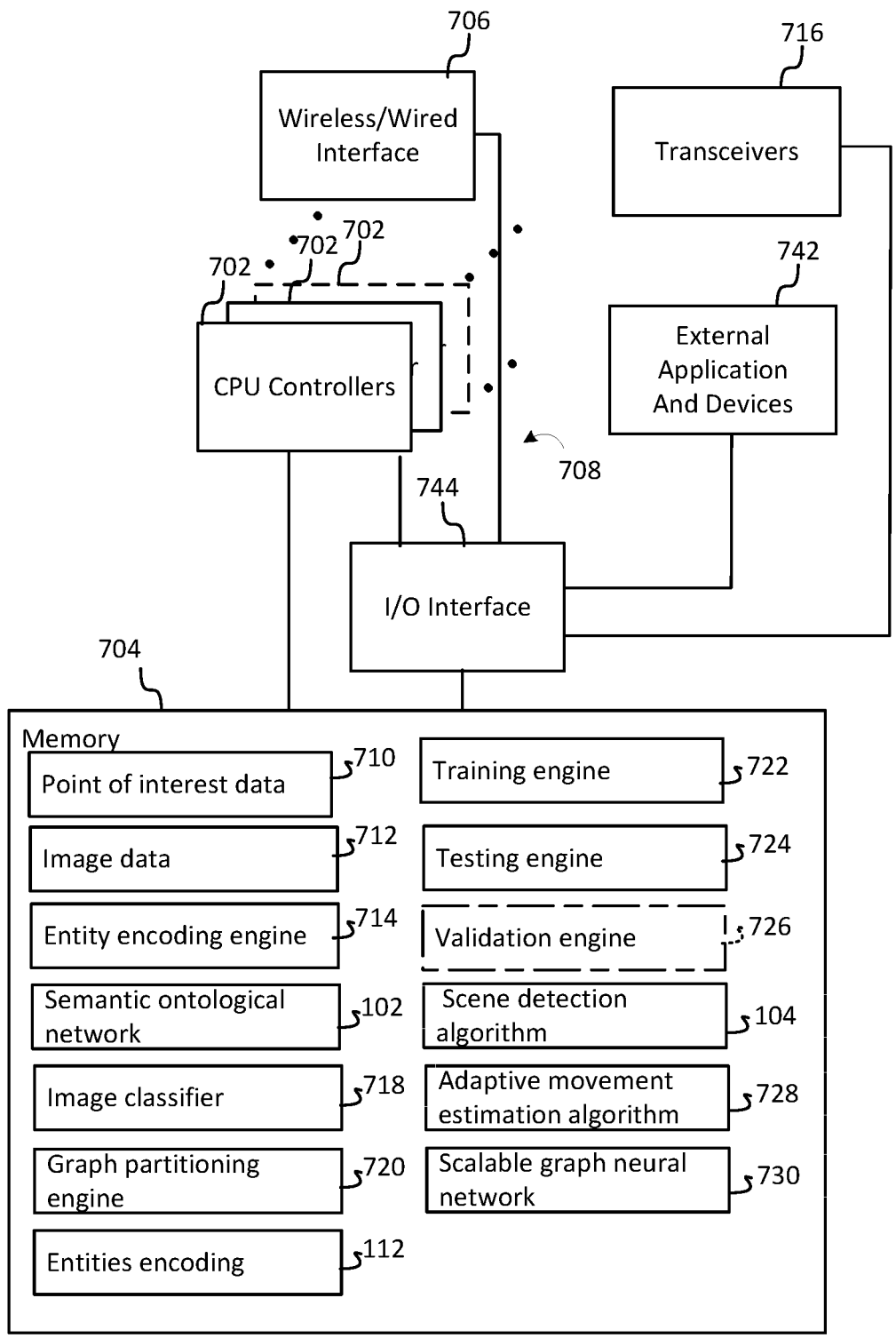
FIG. 7 is a predictive system and components that train a predictive system.

Because some data sources have their own categorization and functionality that assign labels to point of interest data, a unified schema fuses the diverse data sources in the predictive system. In FIGS. 1, 6, and 7, a semantic ontological network 102 preprocesses the heterogeneities of point of interest categories from diverse data sources. In the semantic ontological network, a structured representation defines a relationship between remote data sources and the predictive system. For example, in a use case, each point of interest category from a different data source is mapped to free editable map tags such as those provided by OpenStreetMap®, for example. A collection of OSM® tags are associated with semantic objects through the ontological network 102. OpenStreetMap® and OSM® are mentioned solely for descriptive purposes and their references does not imply an endorsement, affiliation, or an association with the trademarks or its businesses, e.g., OpenStreetMap foundation.

In a use case, the OSM® tags schema includes key value pairs that identify the type of facility and the functional use, which serve as a geometric normalization and an intermediate semantic bridge that ensures spatial features align and point of interest categories align from to different data sources. In addition, the point of interest categories are mapped to a point of interest category hierarchal structure that organizes different levels (e.g., two, three or more) of semantic specificity in a layered fashion, allowing the system to aggregate point of interest data at different programmable semantic granularity levels. For example, hierarchal structure for point of interest data for a blood bank may comprise: {Category: Blood bank, osmCategory: healthcare=blood_donation; amenity=clinic; building=office, categoryLevel0: nonresidential, categoryLevel1:institutions/public services, categoryLevel2: healthcare}. Since different systems require different levels of granularity, some systems use frameworks with more or fewer layer.

The points of interest data and geo-tagged ground-level images (referred to as images) are encoded into numerical vectors by an entity encoding engine 714 (shown in FIG. 7). The images are tagged using a predetermined number of unique predictive system tags. A convolutional neural network shown as an image classifier 718 or image classification neural network executes a detection one or more algorithms 104. An exemplary image classifier 718 comprises convolutional layers, pooling layers, fully connected layers, residual blocks, and a final layer that executes a scene classification. In a use case, the exemplary image classifier 718 detected about three-hundred and sixty five scene categories or unique predictive system tags with associated confidence or probability values that were used by the predictive system. For system validation and data analysis, fewer categories were used that have higher confidence or probability values. The number of categories used can be selected based on need of handling sparseness in data (e.g., set of image tags). Areas of interest used may be selected based on a desired application context.

In FIG. 1, images are tagged (e.g., adding annotations and/or labels to the individual data) using a predetermined number of unique tags and encoded by an entity encoding engine that converts entities from one format to another. A predictive system tag describe a confidence level, and/or metadata associated with each element or item in data that comprises a dataset. This information is processed to classify or identify the elements that comprise the data based on certain characteristics and/or properties. In FIG. 1, the images are encoded as hot encoded vectors of the tags and associated probability objects, where the probability objects associated with each tag classification represent the likelihood of finding an image object described by the tag classification within the image. The point of interest data are tagged and further associated with discrete categories that may include hierarchical levels of types and/or genre classification objects, for example, and encoded as similarity vectors. A similarity vector quantifies the similarity or semantic distance between two or more objects in a vector space. This means that the point of interest encoding includes a similarity score between the category and the fixed/predetermined set of image tags. In FIG. 1, the encoded entities construct the entity graph such as a nearest neighbor graph. The number of nearest neighbor is a control parameter selected by the application of interest.

More specifically, in a set of images designated I within an areas of interest, each individual image i that is part of a set I, i∈I, is associated with a set of predetermined probability-weighted tags, $t \subset T$, where T represent the set of probability-weighted tags and the individual probability-weighted tags t are a subset of the set of probability-weighted tags. $|T|=365$ in a use case. The encoding of the image vector is represented as a sparse vector $v_{image} \in R^{|T|}$, where $V_{image}{}^i$ is the probability score for the $i^{th}$ tag if present, otherwise it is set to zero. In other words, the vector $V_{image}$ belongs to the vector space $R^{|T|}$, where R is a real number and $\wedge |T|$ indicates that the vector space has a dimension of the magnitude of the set of probability-weighted tags.

In the data set of points of interest data designated P within the area of interest, each point of interest data p is an element of the point of interest data set P, where p∈P, there is point of interest data associated with a category set $c \subset C$, where c is a subset of C. The overall encoding represented as a sparse vector $v_{poi} \in R^{|T|}$ where $v_{poi}{}^i$ comprises a point of interest vector having a word similarity score between the category of the point of interest data p and the $i^{th}$ tag in the image tags vector. When a predetermined threshold is applied to the point of interest vector, $v_{poi}$, the values at or above the predetermined threshold are retained and those below the predetermined threshold are zeroed out. In alternate use cases, the predetermined threshold is based on a confidence level $100(1-\alpha)$, for the predictive system where the probability $1-\alpha$ comprises a confidence coefficient and $\alpha$ comprises the significance level, which is the probability of rejecting the null hypothesis. The null hypothesis in some alternate use cases comprises a statement that there is no significant difference between the predictive system tags. In FIG. 1, a pretrained natural language processing engine, such as an open source pretrained language model with pre-learned linguistic patterns, computes word similarity scores. In some systems, Foundational Models, Large language models, generative pretrained transformer architectures, and/or other neural network models may compute similarity scores such as Google® BARD® and OpenAI® ChatGPT®, for example. BARD® and ChatGPT® are mentioned solely for descriptive purposes and their references does not imply an endorsement, affiliation, or an association with the trademarks or its businesses, e.g., Google® and OpenAI®, respectively.

In FIG. 1, the entity encoding shows the vector representations for the location image data and point of interest data. A shared semantic embedding executed by an entity encoding engine that is part of or comprises the entities encoding 112 that computes straight line semantic distance measurements such as Euclidean semantic distance measurements between nodes in the multidimensional semantic space represented in a proximity graph such as a nearest neighbor graph, for example. By using a shared semantic embedding, the points of interest vectors and image vectors may be discriminated, presented, and/or compared directly through a visual representation, for example.

A proximity graph such as nearest neighbor graph shown as the entities graph 106 in FIG. 1, for example, is generated by the entity encoding engine that is part of or comprises the entities encoding 112. The exemplary graph includes nodes equal to the total number of point of interest data and image data in the data sample set. Edges are established between nodes (e.g., entities) that are semantically closest to each other based on Euclidean distance measurements. The Euclidean distance measurements quantify their semantic similarity and their proximity. A pair of nodes between which an edge exists in the graph represent a sample from a positive class. Similarly, a pair of nodes between which an edge does not exist represent a sample from a negative class. A positive class refers to nodes that belong to the same category of interest or a target class. A negative class refers to the nodes that do not belong to the same category of interest.

To train the predictive system, the nearest neighbor graph shown as the entities graph 106 is randomly and/or arbitrarily split into subgraphs by a graph partitioning engine 720 with about seventy-percent of the edges assigned to the training subgraph 108 and approximately thirty-percent of the edges (those remaining) assigned to the testing and validation subgraphs 110 (or testing subgraph) in an exemplary use case. The thirty-percent is then divided between the testing engine 724 and an optional validation engine 726 or used by the testing engine 724 exclusively. In other exemplary use cases, about eighty percent of the edges are assigned to the training subgraph 108 and approximately twenty-percent of the edges (those remaining) are assigned to the testing and validation subgraphs 110 (or the testing subgraph, exclusively). In other use cases, the split ratio varies with the size of the entities graph 106 or nearest neighbor graph and the specific requirements for the machine learning models.

In FIG. 1 the training subgraph(s) 108 are processed by the training engine 722 to train the scalable graph neural network(s) 730 for edge and/or link predictions. The scalable graph neural network 730 learns from the patterns and relationships occurring in the training subgraph(s) 108 to make those edge and/or link predictions, and in some systems, displaying them and labeling them within an entity graph 106. Some alternate training engines 722 determine the depth of the scalable graph neural network(s) 730 (the number of hidden layers in the scalable graph neural network 730), the activation functions used (e.g., rectified linear units, sigmoid, etc.), the subgraph batch size that specifies the number of subgraphs processed in each iteration of the training session, the activation and/or deactivation of neural network layers, the number of epochs processed or times all the training subgraphs are processed through the scalable graph neural network 730 during training, and/or the dropout rate reflecting the number of neurons randomly dropped during a training session. A training session comprises the time during which the training process is running in which the scalable graph neural network's 730 parameters, including it weights, biases, layer order, layer activation/deactivation and/or hyperparameters are iteratively updated based on the training subgraph 108. In some systems, the training session lasts until a predetermined training time period is reached or the scalable graph neural network 730 converges when processing the testing and validation subgraphs 110 (or the testing subgraph), meaning its loss is minimized (e.g., meaning the loss measurement is at or below a predetermined threshold) and/or it is capable of making accurate edge and/or link predictions at or above a predetermined accuracy threshold or below a predetermined uncertainty threshold.

In a use case, a scalable graph neural network 730 architecture trains on the graph-structured data, where the nodes represent the image entities and the point of interest entities and the edges represent the relationships between both entities. In operation, for each node in a subgraph, a fixed sample size of neighboring nodes, is randomly selected. The sampling allows the scalable graph neural network 730 to scale large subgraphs efficiently. The training aggregates feature information of the sampled neighbors to render a representative embedding for a node. The aggregated node embeddings are concatenated or aggregated to incorporate information from the neighborhood in the selected node. The embeddings are passed through a scalable graph neural network layer to render a new embedding for each node. A stacking and/or ordering of the neural network layers refine the embeddings by processing larger neighborhood information and more nodes with the final node embedding represented by two or more scalable graph neural network 730 layers.

In more detail, the scalable graph neural network 730 layers aggregate node features for a node's local neighborhood, learning node representations by coupling the node's neighborhood topological structure with the distribution of the node features. Specifically, using a deep graph library, the scalable graph neural network 730 is constructed by computing a score that measures the similarity or alignment between the representations of node pairs (e.g., $n_i$, $n_j$) using the dot product function, as expressed in equation 1.

$$\hat{y}_{n_i,n_j} = n_i \cdot n_j \qquad (1)$$

In words, the predicted value $\hat{y}_{n_i,n_j}$ between node pairs $n_i$, $n_j$ is equal to the dot product of the node pairs. This means that the prediction is based on the multiplication of the two nodes.

Using an extension of a stochastic gradient descent optimization method, such as an adaptive movement estimation algorithm 728, the scalable graph neural networks 730 are trained. In each training iteration, the training subgraph(s) 108 are processed by the scalable graph neural network 730 in which the scalable graph neural network 730 executes a forward propagation, in which some or a portion of the training subgraph(s) 108 are passed through the scalable graph neural network 730 to render training predictions. Following the forward propagation, a loss function is executed to quantify how far off the training predictions are from the correct values. A binary cross-entropy loss measure expressed in equation 2 calculates loss. The training session continues until the scalable graph neural network 720 converges such as when a binary cross-entropy loss measure falls below a predetermined threshold and/or when accurate edge or link predictions are made at or above an accuracy confidence level with new graphs and subgraphs.

$$L = -\sum_{n_i,n_j} y_{n_i,n_j} \log(\hat{y}_{n_i,n_j}) + (1 - y_{n_i,n_j})\log(1 - \hat{y}_{n_i,n_j}) \qquad (2)$$

Here, $y_{n_i,n_j}$ represents the true target or ground truth edge value of a specific node pairs ($n_i$, $n_j$), $\hat{y}_{n_i,n_j}$ represents the predicted edge value or output for the node pair input, and log is the natural logarithmic function. The summation is taken over all of the node pairs, so that the overall loss function L represents the average loss across all of the nodes for a given subgraph.

In use, when $y_{n_i,n_j}=1$, the first term $y_{n_i,n_j} \log(\hat{y}_{n_i,n_j})$ encourages the network to have a high predicted value close to 1 when the target is 1. The closer $\hat{y}_{n_i n_j}$ is to 1, the lower the loss, and the better the edge prediction. For $y_{n_i n_j}=0$, the second term $(1-y_{n_i n_j}) \log (1-\hat{y}_{n_i n_j})$ encourages the network to have a low predicted value (close to 0) when the true target is 0. The closer $\hat{y}_{n_i n_j}$ is to 0, the lower the loss and the better the prediction. With the goal being to minimize the loss function, the training process adjusts the weights and biases of the scalable graph neural network 730, and in some systems, the layer order and activations/deactivation of some or all of the layers of the scalable graph neural network 730, so that the edge predictions become more accurate and closer to the true target value. In some alternate systems, the layer order is changed randomly and in some alternate systems this occurs through layer activation and/or layer deactivations and in some other use cases weights and biases are changed too before the training and evaluation is repeated.

Optional validation subgraphs may further tune the hyperparameters of the scalable graph neural network 730 and evaluate the process during the training session in alternate predictive systems. The optional validation engine 726 prevents overfitting where the scalable graph neural network 730 makes accurate edge and/or link predictions during the training session but may make inaccurate predictions when processing nodes not part of the training subgraph(s) 108. An exemplary optional validation engine 726 guides the selection of the hyperparameters, biases, and layer activations/deactivations of the scalable graph neural network 730. An exemplary optional validation engine 726 may prevent overfitting by comparing the scalable graph neural network's 730 performance by monitoring its cross-entropy loss after each epoch of the training subgraph(s) 108 by also processing a validation subgraph or a portion thereof. When scalable graph neural network's 730 performance begins to degrade or plateaus when processing the validation subgraph, despite the scalable graph neural network's 730 continued improvement processing the training subgraph's 108, for example, the optional validation engine 726 may stop the training session to prevent the scalable graph neural network 730 from overfitting. Further, if an exemplary training engine 722 evaluates different hyperparameter and/or layer configurations during a training session, the optional validation engine 726 may select the configuration that shows the best performance (e.g., the lowest loss function) with a validation subgraph during the training session to ensure the training of the scalable graph neural network 730 balances the fitting of the training subgraphs 108 with accurate predictions for the validation subgraphs. In FIG. 1, the testing subgraphs are processed by the testing engine 724 to evaluate the performance before the predictive systems are rendered for a variety of downstream applications and/or devices 742 when its predictions meet and/or exceed a predetermined accuracy level or predetermined threshold or uncertainty levels are below a predetermined threshold. Training repeats until the predictive system meets or exceeds that predetermined accuracy level or is below the predetermined uncertainty threshold. The predictive systems predict edges between entities, context (e.g., related information), and labels. Exemplary downstream applications include automatic quality assurance devices, point of interest and location services providers, automatic data cleaning (e.g., without human intervention), fine-grained and information rich point of interest configurable devices, etc.

Figure 2:
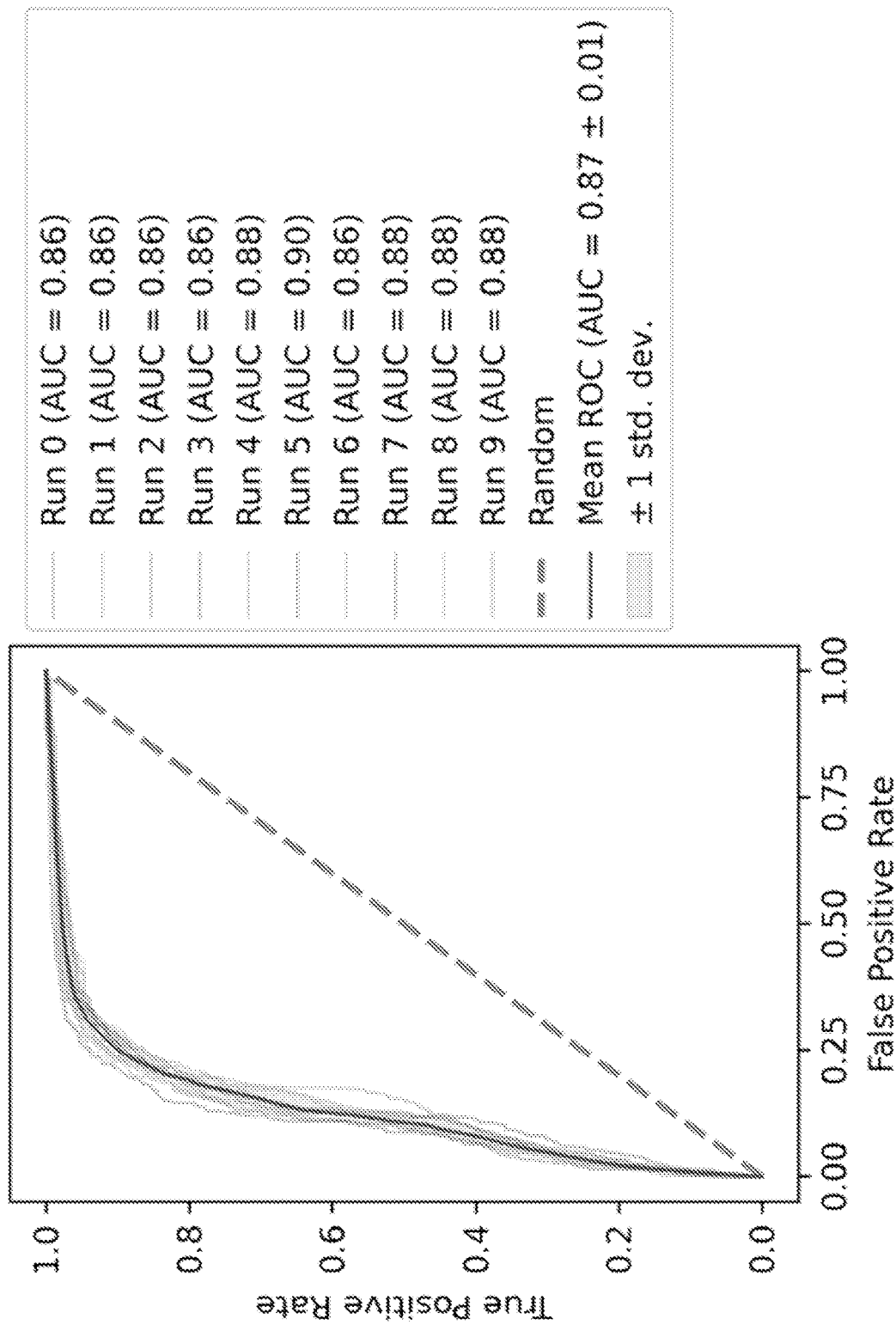
FIG. 2 is a receiver operating characteristic curve of a predictive system trained on geospatial images and area of interest data.
Figure 3:
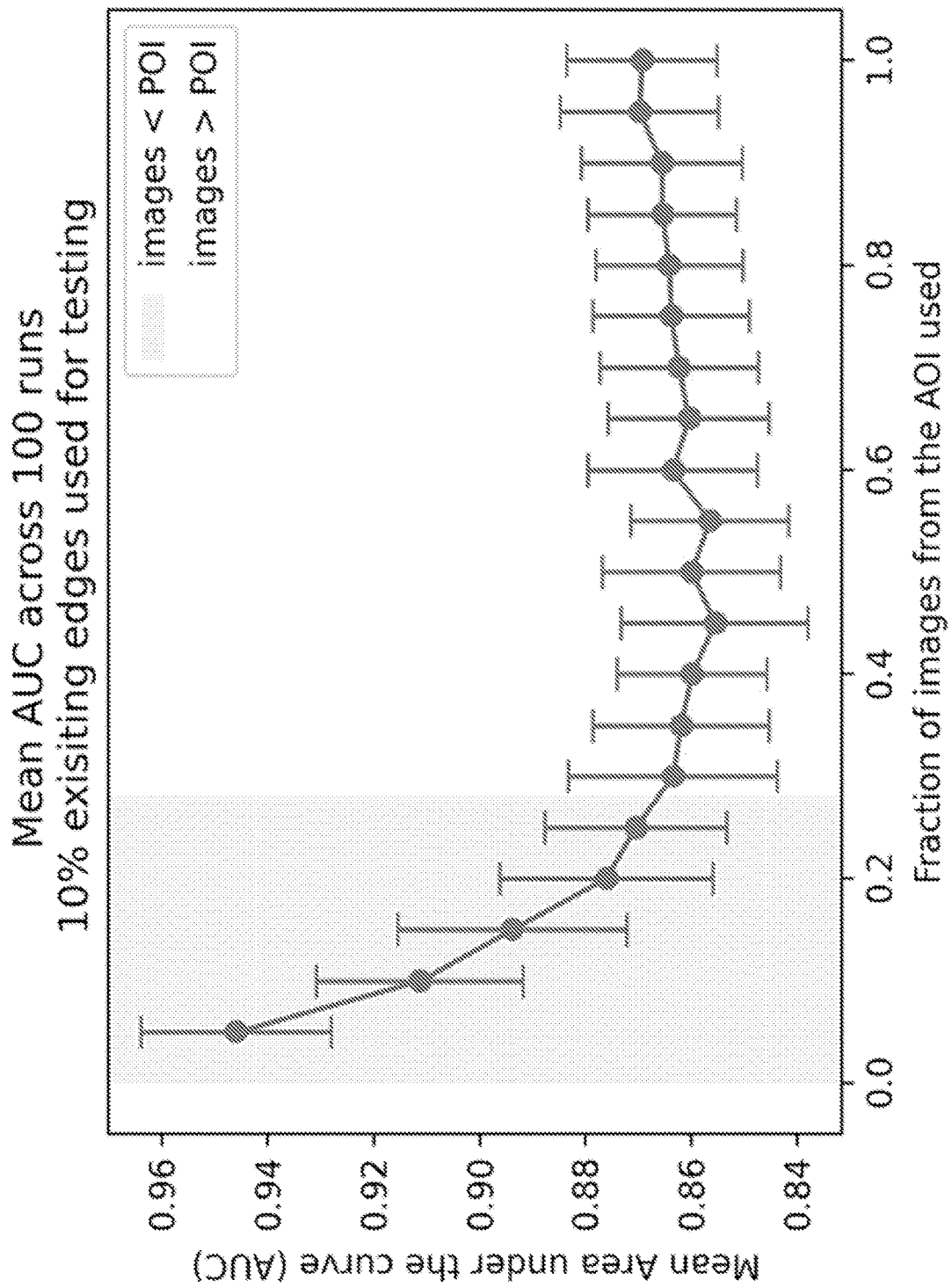
FIG. 3 shows the area under the receiver operating characteristic curve after more than a hundred executions of a predictive system.

FIG. 2 shows the performance of the scalable graph neural network 730 during the training session through a receiver operating characteristic curve rendered by the scalable graph neural network 730 executed on ten different training sessions. Through the ten testing cycles, the scalable graph neural network 730 processed three and half times as many image entities as points of interest entities. In the conflation of image data and points of interest data, there may comprise different proportion of image datapoints and points of interest datapoints. In FIG. 2 the ratio between number of image datapoints and points of interest datapoints was selected as 3.5. In FIG. 3, the plateau shown in the a receiver operating characteristic curve was reached when approximately thirty percent of the images (e.g., the area of interest was processed). Accurate predictions occur at about eighty-six percent of the time indicating a very effective predictive system.

Figure 4:
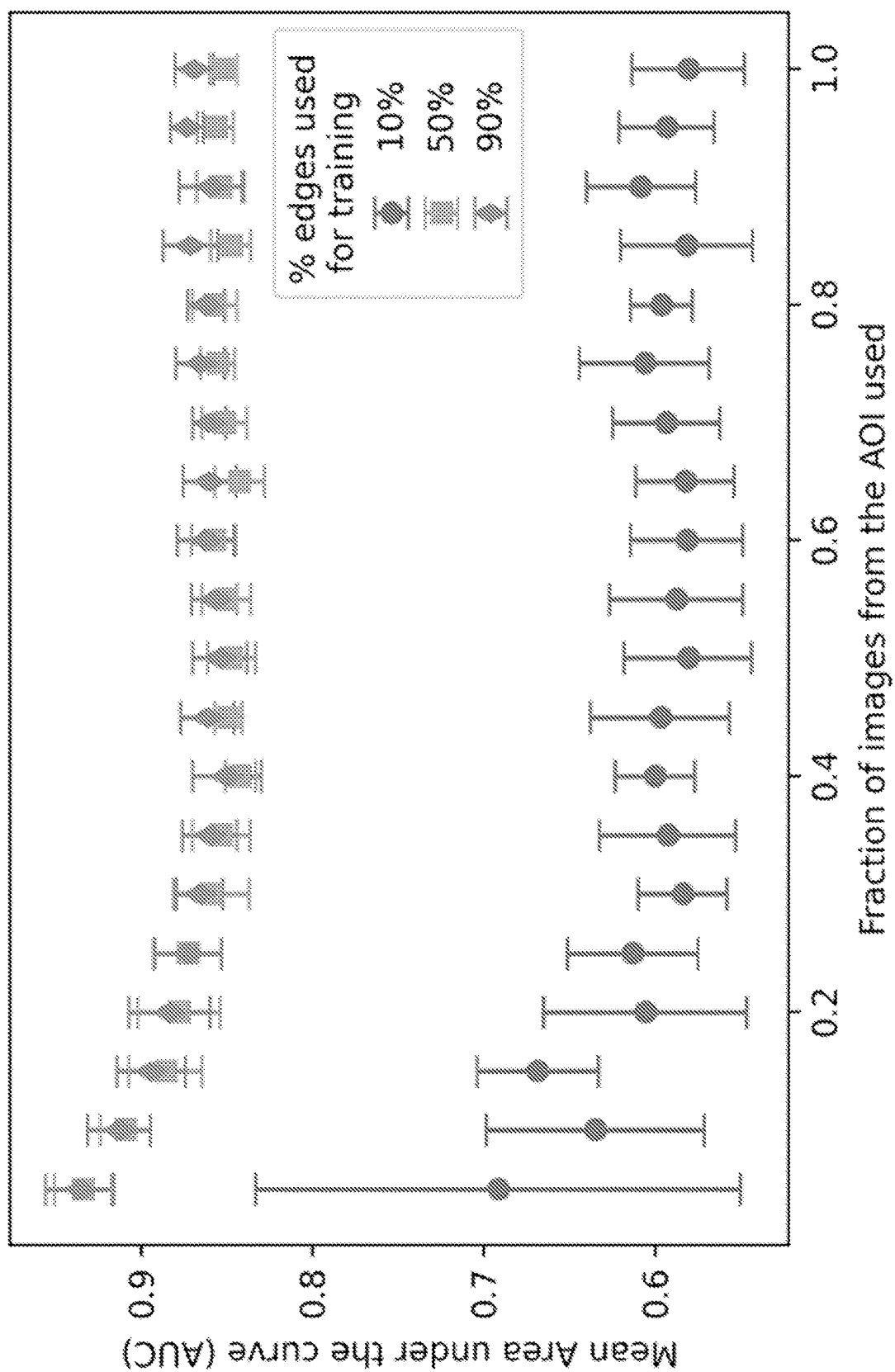
FIG. 4 shows the effect of processing a different number of edges when training a predictive system.
Figure 5:
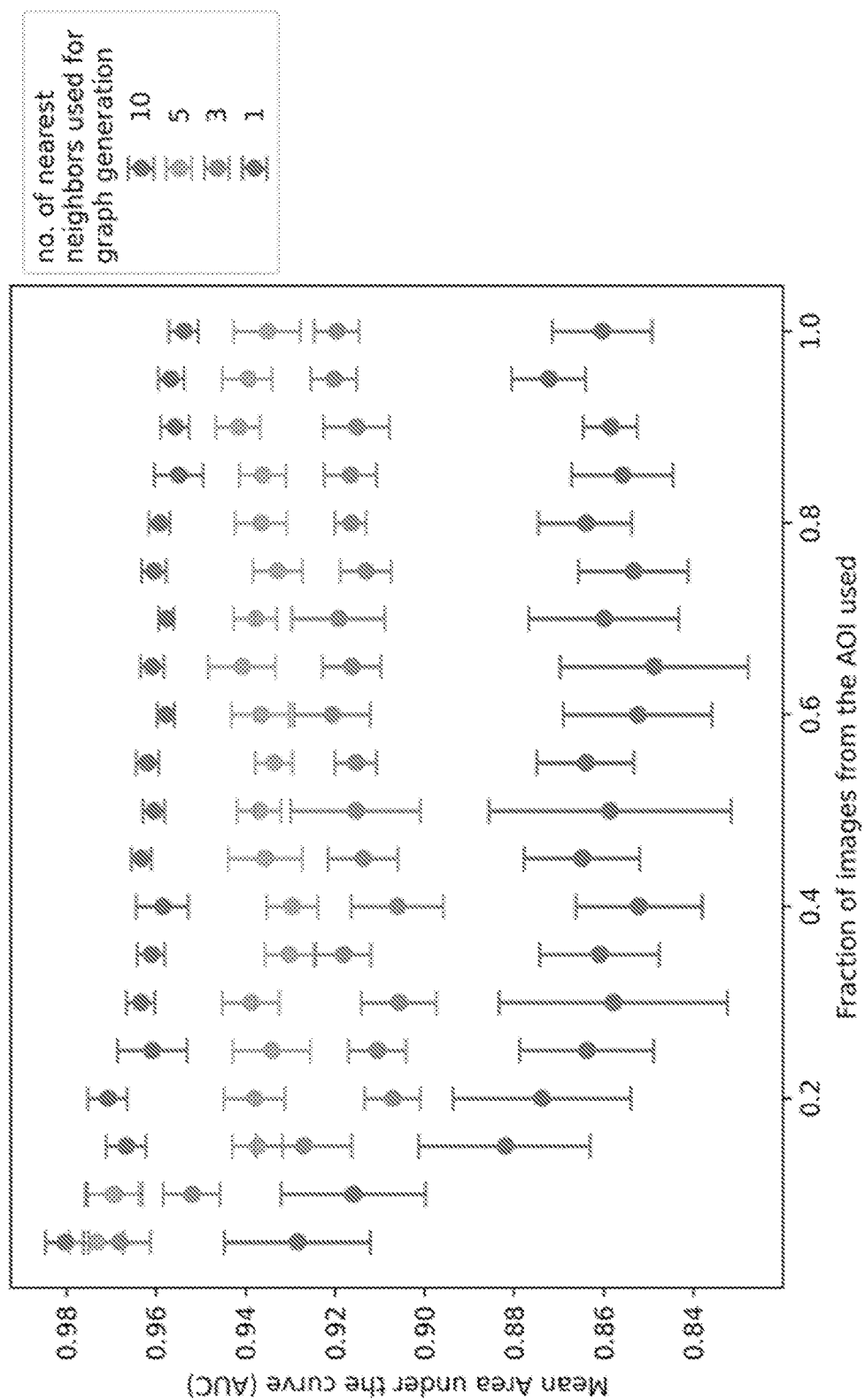
FIG. 5 shows the effect of varying the number of neighbors in a nearest neighbor graph through the mean area under a receiver operating characteristic curve.

FIG. 4 shows that the predictive system is affected minimally by reducing the number of existing edges processed during a training session from an area of interest (AOI). There is little difference in predictive system performance between using fifty-percent of the edges (edges of the entities graph, e.g., the conflated graph) for training versus about ninety-percent of the edges for training. FIG. 5 shows the effect of processing denser graphs by training on the nearest neighbors ranging from one to ten nearest neighbors. FIG. 5 further shows that denser graphs include more topological information and render more accurate predictions.

FIG. 6 is a process that generates a predictive system. The process receives point of interest data and image data from two or more distinct sources 602 and 604 that may be preprocessed spatial aligned features and point of interest categories as described. Point of interest data received through a semantic ontological network 102 and geo-tagged ground-level images are harvested by one or more scene detection algorithms 104. The images are tagged (e.g., annotated or labeled) using the predetermined number of unique tags at 606 and then encoded by an entity encoding engine 714 that converts entities from one format or representation to another at 608. In FIG. 6, the images are encoded as hot encoded vectors of the tags and an associated probability, where the probability associated with each tag represents the likelihood of finding a given object described by the tag being contained within the image. The point of interest data are also similarly tagged and further associated with discrete categories at 606 and encoded as similarity vectors by the entity encoding engine 714 at 610. The point of interest encoding at 610 includes a similarity score between the category and the tag, where each tag is selected from predefined set of tags extracted from images. The encoded entities (e.g., the point of interest datapoints and the image datapoints) become the nodes of the entity graph 106. A shared semantic embedding executed by the entity encoding engine 714 allows the predictive process to compute straight line semantic distance measurements (not a geographic distance) such as Euclidean distance measurements between nodes in the multidimensional space represented in an entity graph 106 such as a nearest neighbor graph, for example.

A proximity graph such as a nearest neighbor graph shown as the entities graph 106 in FIG. 1, for example, is generated at 612. The exemplary entity graph 106 includes nodes equal to the total number of point of interest data 710 and image data 712 in the data sample sets. Edges are established between entities that are semantically closest to each node by measuring the shortest semantic distance between them. Euclidean semantic distance measurements quantify their proximity. A pair of nodes between which an edge exists in the graph represent a sample from a positive class. Similarly, a pair of nodes between which an edge does not exist represent a sample from a negative class.

To train the predictive process, the proximity graph shown as a nearest neighbor graph is split into subgraphs at 614 by a graph partitioning engine 720 with about seventy-percent of the edges assigned to the training subgraph and approximately thirty-percent of the edges (those remaining) assigned to the testing and validation subgraph in an exemplary use cases. In other processes, the split ratio varies with the size of the proximity graphs or nearest neighbor graph and the specific requirements for machine learning models.

In FIG. 6 the training subgraphs 108 are processed by the training engine 722 to train the scalable graph neural networks 730 for edge and/or link predictions at 616. The scalable graph neural networks 730 learn from the patterns and relationships occurring in the subgraphs to make those edge and/or link predictions. Some alternate training engines 722 determine the depth of the graph neural networks 730 (the number of hidden layers in the neural network), the activation functions used (e.g., rectified linear units, sigmoid, etc.), the subgraph batch size that specifies the number of subgraphs processed in each iteration of the training process, the number of epochs processed or times all the training subgraphs are processed through the graph neural networks during training, the activation/deactivation of layers and/or the dropout rate reflecting the number of neurons randomly dropped during a training session.

In an exemplary training process 616, a scalable graph neural network 730 architecture trains on the graph-structured data, where the nodes represent the image entities and the point of interest entities and the edges represent the relationships between the entities. In the process, for each node in the subgraph, a fixed sample size of neighboring nodes is randomly selected. The sampling allows the scalable graph neural network 730 to scale large subgraphs efficiently. The training process aggregates information of the sampled neighbors to render a representative embedding for each node being processed. The aggregated node embeddings are concatenated or aggregated by the training process 616 to incorporate information from the neighborhood in the selected node being processed. The embeddings are passed through a graph neural network layer to render a new embedding for that node being processed based on its neighbors information. A stacking of layers refine the embeddings by processing larger neighborhood information and nodes with the final node embedding represented by several neural network layers.

In more detail, the neural network layers aggregate node features for a node's local neighborhood during the learning process, learning node representations by coupling the node's neighborhood topological structure with the distribution of the node features. Specifically, using a deep graph library, the scalable graph neural network 730 is generated by computing a similarity score between the representations of node pairs (e.g., $n_i$, $n_j$) using dot product function, as expressed in equation 1. Using an extension of a stochastic gradient descent optimization method, such as an adaptive movement estimation algorithm 728, the scalable graph neural networks 730 are trained. In each training iteration, the training subgraphs 108 are processed by the scalable graph neural network 730 in which the scalable graph neural network 730 executes a forward propagation, in which some or a portion of the training subgraphs 108 are passed through the scalable graph neural network 730 to render training predictions. Following the forward propagation, a loss function is executed to quantify how far off the training predictions are from the correct values. A binary cross-entropy loss measure expressed in equation 2 calculates the loss. With the goal being to minimize the loss function, the training process adjusts the weights and biases of the scalable graph neural network 730, and in some processes, the layer order and/or activations/deactivations of some or all of the layers of the scalable graph neural network 730, so that the edge predictions become more accurate and closer to the true target value. The training process continues until a predetermined training time period lapses and/or the scalable graph neural network converges when processing the training subgraphs and accurate edge or link predictions may be made with new graphs and subgraphs at or above a predetermined confidence level or threshold or below an uncertainty threshold.

Optional validation subgraphs may tune the hyperparameters, bias, and/or activation/deactivation layers of the scalable graph neural network 730 and evaluate the process during the training session in alternate predictive processes at 618. The optional validation engine 726 prevents overfitting where the graph neural network process makes accurate edge and/or link predictions during the training process 616 but make inaccurate predictions when processing previously unseen nodes. An exemplary optional validation engine 726 guides the selection of the hyperparameters of the scalable graph neural network process. An exemplary optional validation engine 726 may prevent overfitting by comparing the scalable graph neural network's 730 performance by monitoring its cross-entropy loss after each epoch on the training subgraphs by also processing a validation subgraph or a portion thereof. When the scalable graph neural network's 730 performance begins to degrade or plateaus during the training process when processing the validation subgraphs, despite its continued improvement processing the training subgraphs 108, for example, the optional validation engine 726 may stop the training process at 616 to prevent the scalable graph neural network 730 from overfitting. Further, if an exemplary training engine 724 evaluates different hyperparameter configurations during a training session, the optional validation engine 726 may select the configuration that shows the best performance (e.g., the lowest loss function) with a validation subgraph during the training process to ensure the training of the scalable graph neural network 730 balances the fitting of the training subgraphs with accurate predictions for the validation subgraphs.

In FIG. 6, the testing subgraphs are processed by the testing engine 722 to evaluate the performance of the graph neural network at 620. When the accuracy of the scalable graph neural network's 730 accuracy reaches or exceeds a predetermined threshold at 622 (e.g., the loss function falls below a predetermined threshold when processing the test subgraphs) and/or it is capable of making accurate edge and/or link predictions at or above a predetermined threshold or below an uncertainty threshold, the scalable graph neural network 730 is released at 624. The trained scalable graph neural network 730 may serve other processes, applications, and/or devices to render edge predictions. Exemplary downstream processes include automatic quality assurance processes, point of interest and location service processes, data cleaning processes without human intervention (e.g., automatic cleaning), edge validation processes, providing fine-grained and information rich point of interest information to configurable processes or devices, etc.

FIG. 7 is block diagram of the systems that execute the process flows, functions, and the systems described herein and those shown in FIGS. 1-6. The system comprises one or more central processing units or controller 702 and a non-transitory machine-readable medium such as a memory and/or a cloud services 704 (the contents of which are accessible to the central processing unit or controller 702), one or more transceivers 716, one or more wireless/wired interfaces 706 and a physical or wireless network bus 708 that connects to one or more external applications and devices 742 through an input and output interface 744. External applications and devices 742 include systems and processes that serve geographical information system, systems and processes that serve location-based services, systems and processes that provide geospatial intelligence, systems and processes that serve provide assessment of critical infrastructure for disaster management and/or etc.

The non-transitory machine-readable medium 704 encoded with machine-executable instructions executed by one or more central processing units or controller 702 causes the system to render some or all of the functionality associated with the predictive system described herein. The memory and/or cloud services 704 store point of interest data 710, image data 712, the entity encoding engine 714, the scene detection algorithm 104, semantic ontological networks 102, the image classifier 718, the graph partitioning engine 720, the training engine 722, the testing engine 724, the optional validation engine 726, entities encoding 112, and the adaptive movement estimation algorithm 728. The term cloud and cloud system is intended to broadly encompass hardware and software that enables the systems and processes executed and data to be maintained, managed, and backed up remotely and made available to users over a network. In this system, clouds and/or cloud storage provides ubiquitous access to the system's resources that can be rapidly provisioned over a public and/or a private network at any location. Clouds and/or cloud storage allows for the sharing of resources, features, and utilities in any location to achieve coherence services.

The cloud/cloud services or memory 704 and/or storage disclosed also retain an ordered listing of executable instructions for implementing the processes, system functions, and features described above in a non-transitory machine or computer readable code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM) or a Flash memory, or a database management system. The cloud/cloud services and/or memory 704 may comprise a single device or multiple devices that may be disposed on one or more dedicated memory devices or disposed within one or more central processing unit or controllers 702, customized circuit or other similar device. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action.

In a continent of Africa use case, the city of Johannesburg, South Africa was analyzed. The city's points of interest focused on locations and geographic entities such as landmarks, schools, buildings, historical sites, business, public services, shops, restaurants, etc. Exemplary hierarchical levels of genres categories (e.g., genre classification objects) tagged to the point of interest data include {"entertainment", "nightclub"} and {"restaurant", "Italian restaurant"}, classification structures for example. In this use case, the technological features is data conflation or fusion of geo-tagged point of interest, e.g., attributed with categories) data, with geo-tagged ground-level images data, e.g., attributed with probabilistic tags.

The ground level images data in the use case were sourced from images harvested from the social media and included those sourced by Flickr® and Mapillary®, for example, (Flickr® and Mapillary®, and all other registered trademarks identified in this disclosure are mentioned solely for descriptive purposes and their references does not imply an endorsement, affiliation, or an association with the trademarks or the businesses). The disclosed deep learning models extracted set of tags for each image that resulted in large-scale data repository of scene photographs, with scene semantic categories and attributes as labels that were processed by deep convolutional neural network trained through a supervised learning. Pre-trained learning model predicted the descriptive tags for the ground-level images data that were harvested. The image tags were probabilistic objects, with an images classified with 365 tags. Examples of such image tags data of a ground-level image of a place included "supermarket" (0.228), "delicatessen" (0.192), "candy store" (0.190), "fast-food restaurant" (0.075), "department store" (0.052). In alternate systems the top five tag probabilities were further normalized. The data shown in FIGS. 2-5 illustrate the proof of concept for this use case.

In this disclosure the term "engine" refers to a processor or a portion of a program that determines how the programmed device manages and manipulates data. For example, a training engine 722 includes the tools for forming and training artificial intelligence and/or neural networks. The term "substantially" or "about" encompasses a range that is largely in some instances, but not necessarily wholly, that which is specified. It encompasses all but a significant amount, such as what is specified or within five to ten percent. In other words, the terms "substantially" or "about" means equal to or at or within five to ten percent of the expressed value. Forms of the term "cascade" and the term itself refer to an arrangement of two or more components such that the output of one component is the direct input of the next component (e.g., in a series connection). The term "real-time" and "real time" refer to responding to an event as it occurs, such as making predictions in response to the addition of nodes such as a newly encoded image and/or point of interest. A real time operation are those operations which match external activities and proceed at the same rate (e.g., without delay) or faster than that rate of the external activities and/or an external process. Some real-time predictive systems operate at a faster rate as the physical element it is controlling. The term communication, in communication with, and versions of the term are intended to broadly encompass both direct and indirect communication connections.

The predictive systems that render the disclosed functions herein may be practiced in the absence of any disclosed or expressed element (including the hardware, the software, and/or the functionality expressed), and in the absence of some or all of the described functions association with a process step or component or structure that are expressly described. The systems may operate in the absence of one or more of these components, process steps, elements and/or any subset of the expressed functions. Further, the systems may functions with additional elements and functionality, too. For example, some alternate semantic ontological network 102 temporally-align image and/or point of interest data to ensure that the data from different sources are synchronized in time. Some alternate semantic ontological network 102 monitor image and/or point of interest data consistency by testing outliers by comparisons to reference data and executing data scrubbing by rules and data comparisons that identity errors, inconsistencies, and inaccuracies that may be resolved by removing data (e.g., duplicates and data having missing values), converting data to standardized formats, etc.

Further, the various elements and predictive system components, and process steps described in each of the many systems and processes described herein is regarded as divisible with regard to the individual elements described, rather than inseparable as a whole. In other words, alternate predictive systems encompass any variation and combinations of elements, components, and process steps described herein and may be made, used, or executed without the various elements described (e.g., they may operate in the absence of) including some and all of those disclosed in the prior art but not expressed in the disclosure herein. Thus, some systems do not include those disclosed in the prior art including those not described herein and thus are described as not being part of those systems and/or components and thus rendering alternative systems that may be claimed as systems and/or methods excluding those elements and/or steps.

The disclosure describes a system and/or process constructs a proximity graph or nearest neighbor graph such that every node or nearly every node in the graph comprises a dimensional vector that is either a point of interest or an image such that the vector is encoded with semantic information about the point of interest and/or the image, respectively. Between the vectors that are represented as nodes in a proximity graph or near neighborhood graph edges between a pair of nodes are predicted that are nearest neighbors of each other's in a semantic space (e.g., establishing a mathematical relation). The disclosed predictive systems predict edges between nodes (e.g., entities) or from nodes (e.g., entities) in a graph via a scalable graph neural network 730, which learns the relationship between nodes using semantic information and also learns and predicts the topological structure of the graph.

The disclosure further describes generating a geospatial dataset for an area of interest with multimodal information from points of interest with hierarchical attributes, and from ground-level images with probabilistic tags. It discloses a data fusion system trained on multimodal geospatial data, that applies different entity encoding and applies a common semantic embedding based on a joint graphical model representation of point of interest and images data. It discloses a graph analysis-based link and label prediction system and process that augments point of interest data with contextual images data that can be used with other downstream applications, devices, processes, and/or analytics.

The disclosure also discloses detail of the predictive system's performance in predicting links or edges between entities in a joint point of interest and image graph models and validates the effectiveness of semantic embedding. The disclosure characterizes the effect on link prediction accuracy based on multiple factors, such as, for example, the varying degree of availability of images data, with respect to point of interest data, the amount and use of graph edge information used during training, and multiple proximity graph generations such as nearest neighbor graphs, for example.

Other systems, methods, features and advantages will be, or will become, apparent to one with skill in the art upon examination of the figures and detailed description. It is intended that all such additional systems, methods, features, and advantages be included within this description, be within the scope of the disclosure, and be protected by the following claims.

The invention claimed is:

1. A non-transitory machine-readable medium encoded with machine-executable instructions, wherein execution of the machine-executable instructions is for:
   harvesting geo-tagged ground-level images through a scene detection algorithm executed by an image classifier;
   receiving point of interest data representing structures or events through a transceiver;
   tagging each of the geo-tagged ground-level images with a probability object describing a tag classification;
   tagging each of the point of interest data with a hierarchical level genre classification object;
   encoding tagged geo-tagged ground-level images as hot encoded vectors to render a first plurality of nodes and a first edge on a proximity graph;
   encoding tagged point of interest data as a similarity vector to render a second plurality of nodes and a second edge on the proximity graph associated with the first node by a calculated semantic distance measurement;
   splitting the proximity graph into a training subgraph and a testing subgraph;
   initiating a training session of a neural network by processing the training subgraph during a training session that includes aggregating information at a selected node within the training subgraph by sampling information from a neighboring node within the training subgraph;
   terminating the training session when a binary cross-entropy loss measurement based on the training subgraph falls below a predetermined threshold; and
   initiating an evaluation of the neural network by processing the testing subgraph.

2. The non-transitory machine-readable medium of claim 1, where the calculated semantic distance measurement comprises a calculated Euclidean distance measurement.

3. The non-transitory machine-readable medium of claim 1, where the proximity graph is constructed from a plurality of dot products.

4. The non-transitory machine-readable medium of claim 1, where the binary cross-entropy loss measurement comprises an average loss measurement based on a predicted edge value and a calculated edge value.

5. The non-transitory machine-readable medium of claim 4, where the binary cross-entropy loss measurement comprises:

$$-\sum_{n_i,n_j} y_{n_i,n_j} \log(\hat{y}_{n_i,n_j}) + (1 - y_{n_i,n_j})\log(1 - \hat{y}_{n_i,n_j})$$

where $\hat{y}_{n_i,n_j}$ represents a calculated edge value for a node pair $n_i$, $n_j$ and $\hat{y}_{n_i,n_j}$ represents a predicted edge value for the node pair input for the node pair $n_i,n_j$.

6. The non-transitory machine-readable medium of claim 1, where the neural network comprises a scalable graph neural network.

7. A process comprising:
   harvesting geo-tagged ground-level images through a scene scene detection algorithm executed by an image classifier;
   receiving point of interest data representing structures or events through a transceiver;

tagging each of the geo-tagged ground-level images with a probability object describing a tag classification;

tagging each of the point of interest data with a hierarchical level genre classification object;

encoding tagged geo-tagged ground-level images as encoded vectors to render a first plurality of nodes and a first edge on a proximity graph;

encoding tagged point of interest data as a similarity vector to render a second plurality of nodes and a second edge on the proximity graph associated with the first node by a calculated semantic distance measurement;

splitting the proximity graph into a training subgraph and a testing subgraph;

initiating a training session of a neural network by processing the training subgraph during a training session that includes aggregating information at a selected node within the training subgraph by sampling information from a neighboring node within the training subgraph; and terminating the training session when a binary cross-entropy loss measurement based on the training subgraph falls below a predetermined threshold.

8. The process of claim 7, where the calculated semantic distance measurement comprises a calculated Euclidean semantic distance measurement.

9. The process of claim 7, further comprising initiating an evaluation session of the neural network by processing the neural network processing the testing subgraph.

10. The process of claim 7, where the proximity graph is constructed based on a dot product.

11. The process of claim 7, where the binary cross-entropy loss measurement comprises an average loss measurement based on a predicted edge value and a calculated edge value.

12. The process of claim 7, where the neural network comprises a scalable graph neural network.

13. An edge prediction system comprising:

an image classifier that harvests geo-tagged ground-level images through one or more scene scene detection algorithms;

a transceiver that receives point of interest data representing structures or events through a transceiver;

a processor that tags each of the geo-tagged ground-level images with a probability object describing a tag classification and tags each of the point of interest data with one of a plurality of hierarchical level genre classification objects;

an encoder that encodes tagged geo-tagged ground-level images as hot encoded vectors to render a first plurality of nodes and a first edge on a proximity graph, and encodes tagged point of interest data as a similarity vector to render a second plurality of nodes and a second edge on the proximity graph associated with the first plurality of nodes by a calculated semantic distance measurement;

a partitioning engine that splits the proximity graph into a training subgraph and a testing subgraph;

a training engine that processes the training subgraph through a neural network during a training session that includes aggregating information at a plurality of selected nodes within the training subgraph by sampling information from one more neighboring node within the training subgraph, and terminates the training session when a binary cross-entropy loss measurement based on the training subgraph falls below a predetermined threshold; and a testing engine that evaluates the neural network by processing the testing subgraph.

14. The system of claim 13, where the calculated semantic distance measurement comprises a calculated Euclidean semantic distance measurement.

15. The system of claim 13, where the binary cross-entropy loss measurement comprises an average loss measurement based on a plurality of predicted edge values and a plurality of calculated edge values.

16. The system of claim 15, where the binary cross-entropy loss measurement is expressed by:

$$-\sum_{n_i,n_j} y_{n_i,n_j} \log(\hat{y}_{n_i,n_j}) + (1-y_{n_i,n_j})\log(1-\hat{y}_{n_i,n_j})$$

where $y_{n_i,n_j}$ represents a calculated edge value for a node pair $n_i$, $n_j$ and $\hat{y}_{n_i,n_j}$ represents a predicted edge value for the node pair input for the node pair $n_i,n_j$.

17. The system of claim 13, where the proximity graph is constructed based on a dot product of the first plurality of nodes and the second plurality of nodes.

* * * * *